United States Patent
Wada

[11] Patent Number: 5,289,091
[45] Date of Patent: Feb. 22, 1994

[54] APPARATUS FOR TURNING MONITORING CAMERA

[75] Inventor: Jyoji Wada, Yokohama, Japan

[73] Assignee: Matsushita Electric Industrial Co., Ltd., Osaka, Japan

[21] Appl. No.: 940,320

[22] Filed: Sep. 3, 1992

[30] Foreign Application Priority Data

Sep. 9, 1991 [JP] Japan .................................. 3-227775

[51] Int. Cl.$^5$ .......................... H02P 1/00; B60Q 1/00
[52] U.S. Cl. ................................. 318/282; 318/286; 318/601; 354/81
[58] Field of Search ............... 318/282, 286, 289, 280, 318/602, 601; 354/81, 293

[56] References Cited

U.S. PATENT DOCUMENTS

| | | | |
|---|---|---|---|
| 3,742,326 | 6/1973 | Okuda et al. | 318/601 |
| 4,110,675 | 8/1978 | Wisner | 318/282 |
| 4,490,742 | 12/1984 | Wurtzinger | |
| 4,558,265 | 12/1985 | Hayashida et al. | 318/602 |
| 4,701,743 | 10/1987 | Pearlman et al. | 318/282 |
| 4,724,371 | 2/1988 | Ito et al. | 318/601 |
| 4,752,791 | 6/1988 | Allred | 354/81 |
| 4,945,417 | 7/1990 | Elberbaum | |

FOREIGN PATENT DOCUMENTS 3933926 2/1991 Fed. Rep. of Germany .
2-8554 2/1990 Japan .

*Primary Examiner*—William M. Shoop, Jr.
*Assistant Examiner*—John W. Cabeca
*Attorney, Agent, or Firm*—Stevens, Davis, Miller & Mosher

[57] ABSTRACT

There is disclosed a monitoring camera turning apparatus. An angle sensor continuously detects the turning angle of a turning shaft for turning a monitoring camera. Two detected angles are recorded as boundary limit angles in a recorder at the moment of generation of trigger signals. In a comparator, the recorded boundary limit angles are compared with the turning angle detected by the angle sensor at a moment. In accordance with results of this comparison, a switch device changes a direction of rotation of the turning shaft, thereby turning the monitoring camera in a monitoring range.

2 Claims, 6 Drawing Sheets

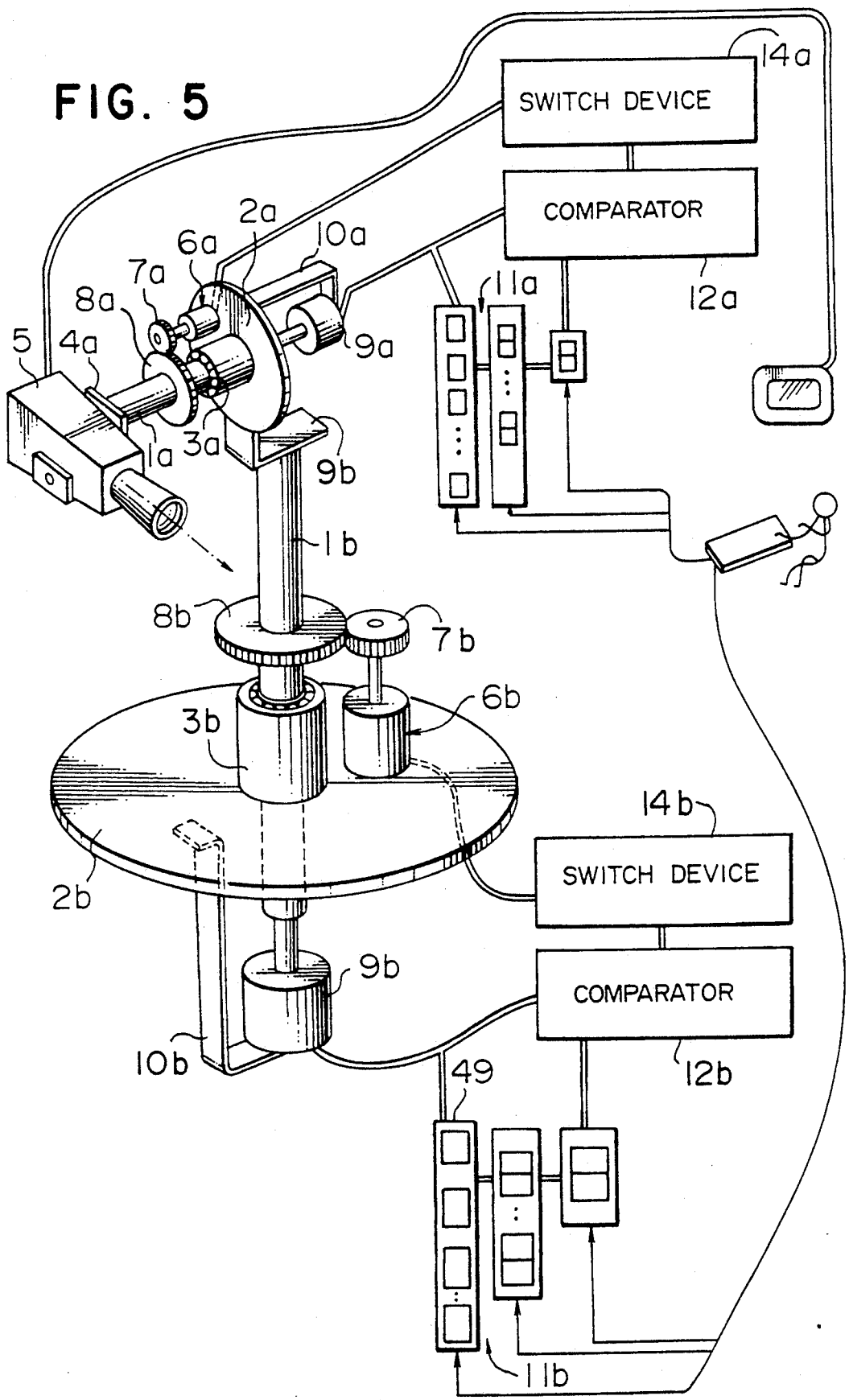

APPARATUS FOR TURNING MONITORING CAMERA

FILED OF THE INVENTION AND RELATED ART STATEMENT

This invention relates to an apparatus for turning or angularly moving a monitoring camera which installed indoors or outdoors for monitoring purposes.

In a conventional turning apparatus, a monitoring camera is mounted on a turning shaft, and an arm extends radially outwards from the turning shaft. A pair of limit switches are mounted on a distal end of the arm. Two stopper members are disposed at angularly or circumferentially-spaced positions in an arc path along which the distal end of the arm moves. The turning shaft is rotated by a motor to turn or rotate (angularly move) the monitoring camera. When one limit switch is brought into contact with one stopper member, the direction of rotation of the motor is reversed, so that the turning shaft is rotated in a reverse direction. When the other limit switch is brought into contact with the other stop member, the direction of rotation of the motor is reversed again, so that the turning shaft is rotated in the former direction. In this manner, the monitoring camera is repeatedly changed in the turning direction and angularly reciprocated within a predetermined monitoring angular area. However, in the above conventional turning apparatus, in order to vary the monitoring range, it is necessary to change the positions of the stopper members, and this is rather cumbersome. Further, it is impossible for the conventional turning apparatus to arbitrarily select one from two or more different monitoring ranges preset. Further, unless the monitoring camera is turned after the installation, it is not possible to exactly know the range of coverage by the monitoring camera. Therefore, there has been encountered a problem that the range of coverage by the monitoring camera differs from a desired one.

OBJECT AND SUMMARY OF THE INVENTION

It is an object of this invention to provide a monitoring camera turning apparatus in which the monitoring range can be easily changed, and a desirable monitoring range can be arbitrarily selected from two or more monitoring ranges preset, and the range of coverage by the monitoring camera exactly corresponds to a desired monitoring range.

To this end, according to the present invention, there is provided an apparatus for turning a monitoring camera comprising means for mounting the monitoring camera, means for detecting a turning angle of the mounting means, means for recording therein a pair of turning angles detected by the detecting means as monitoring boundary limit angles, means for comparing the recorded monitoring boundary limit angles with a turning angle detected by the detecting means at a moment, and means for changing a direction of turning of the mounting means in accordance with results of comparison by the comparing means.

BRIEF DESCRIPTION OF THE DRAWINGS

FIG. 5 is a schematic perspective view of a fourth embodiment of a monitoring camera turning apparatus of the present invention;

DESCRIPTION OF THE PREFERRED EMBODIMENTS

Figure 1:
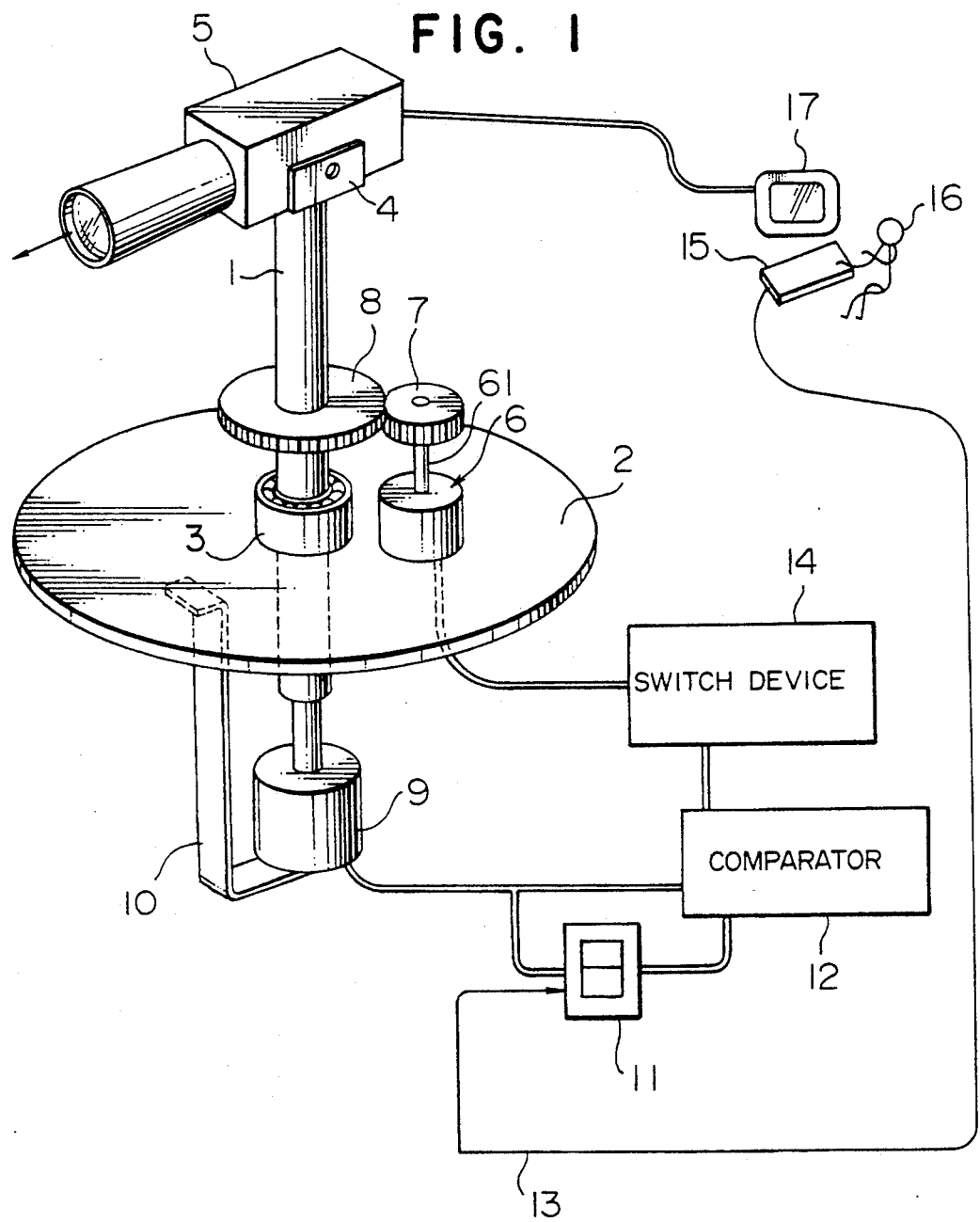
FIG. 1 is a schematic perspective view of a first embodiment of a monitoring camera turning apparatus of the present invention.

Referring to FIG. 1, a turning shaft 1 extends through a stationary disk 2. The shaft 1 is rotatably borne by a ball bearing 3 fixed on the disk 2. A holder 4 for monitoring camera 5 is provided on a one end of the turning shaft 1. A motor 6 is so disposed on the disk 2 that an output shaft 61 thereof extends in parallel to the turning shaft 1. A driving gear 7 is mounted on an end of the output shaft 61 of the motor 6. A driven gear 8 is so fixed to the turning shaft 1 that the driving gear 7 engages with the driven gear 8 to turn the turning shaft 1.

An angular sensor 9 is mounted on the other end of the turning shaft 1. The sensor 9 may include a potentiometer in which an angular displacement is converted into a change of electric resistance, synchro angular displacement sensing device utilizing electromagnetic induction, or a resolver angular displacement sensing device. Further, an encoder can be used as the angular sensor 9. The angular sensor 9 comprises a movable portion for turning or angular movement with the turning shaft 1, and a stationary portion. The stationary portion is secured to the stationary disk 2 through a bracket 10. The data representing turning angles of the shaft 1 detected by the angular sensor 9 are fed to a recorder 11 and a comparator 12. The comparator 12 is connected to a switching device 14. The switch device 14, in accordance with the comparison result in the comparator 12, changes the direction of rotation of the motor 6.

The operation of the turning apparatus of the first embodiment will now be described hereinafter. When the motor 6 is operated to turn or angular move the turning shaft 1 through the drive gear 7 and the driven gear 8, the angular sensor 9 continuously detects the turning angle of the shaft 1, and feeds it to the recorder 11 and the comparator 12. An operator 16 watches a picture in a monitor television 17 picked up by the video camera 5 and then sets the monitoring range of the video camera 5. More specifically, when the video camera 5 is turned and then it reaches each boundary of desired monitoring range, a trigger signal 13 is fed to the recorder 11 by the operator 16 through a control device 15. When the recorder 11 receives the trigger signal 13, it records the detected turning angle at the moment as a boundary limit angle. In this manner, two detected turning angles are recorded in the recorder 11 to determine or set the monitoring angular range.

Thereafter, when the turning shaft 1 is turned, the turning angle thereof continuously detected by the angular sensor 9 is fed to the comparator 12 in which the detected angle is compared with the boundary limit angles recorded in the recorder 11. When the detected angle coincides with one of the recorded boundary limit angles, the comparator 12 outputs a command signal to the switch device 14 so as to change over or reverse the direction of rotation of the motor 6. Then, the turning shaft 1, or the video camera 5 turns in a reverse direction. When the detected angle coincides with other recorded boundary limit angle, the comparator 12 outputs a command signal again to switch device 14 so as to reverse the direction of rotation of the motor 6 again. In this manner, the turning shaft 1 and the video camera 5 are repeatedly changed in the turning direction and angularly reciprocated between the recorded boundary limit angular positions.

In the first embodiment, the monitoring range between the boundary limit angular positions can be arbitrarily set by recording the boundary limit angles detected by the angular sensor 9 in the recorder 11 in advance. The setting can be conducted without mechanical process. Therefore, it is possible not only to set or change the monitoring range, but also to set two or more monitoring ranges. Further, since the setting can be carried out while watching a picture picked up by the video camera (monitoring camera), a desired monitoring range exactly coincides with the actual monitoring range.

Figure 7:
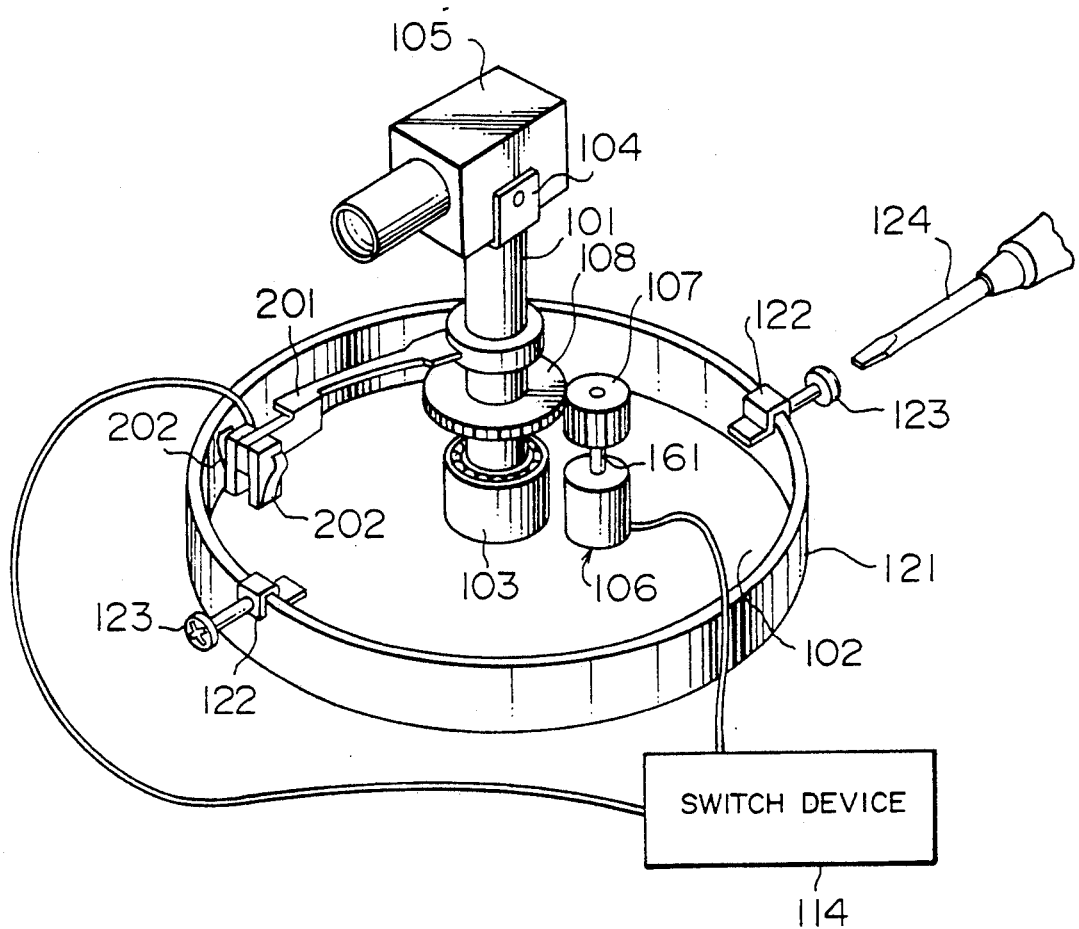
FIG. 7 is a schematic perspective view of a conventional monitoring camera turning apparatus.

On the other hand, in a conventional monitoring camera turning apparatus shown in FIG. 7, a turning shaft 101 extends through a stationary disk 102. The shaft 101 is rotatably borne by a ball bearing 103 fixed on the disk 102. A holder 104 for monitoring camera 105 is provided on a one end of the turning shaft 101. A motor 106 is so disposed on the disk 102 that an output shaft 161 thereof extends in parallel to the turning shaft 101. A driving gear 107 is mounted on an end of the output shaft 161 of the motor 106. A driven gear 108 is so fixed to the turning shaft 101 that the driving gear 107 engages with the driven gear 108 to turn the turning shaft 101.

An arm 201 extends radial outwards from the turning shaft 101, and two limit switches 202 are attached to opposite sides of a distal end of the arm 201. A ring shaped flange 121 is formed on the periphery of the disk 102. Two metal members 122 are so disposed at two positions of the flange 121 angularly spaced from each other that the limit switches 202 abut these metal members 122. The metal member 122 is attached to the flange 121 by means of a screw 123. The limit switches 202 are electrically connected to the motor 106 through a switch device 114. Each time the limit switch 202 abuts on the metal member 122, the switch device 114 alternates the direction of rotation of the motor 106.

Therefore, in the conventional apparatus, in order to change the monitoring range, it is necessary to loosen the screws 123 by the screw driver 124 so as to relocate the metal members 122 and to tighten the screws 123 again. This is cumbersome.

To the contrary, according to the present invention, it is possible to avoid these troubles.

Figure 2:
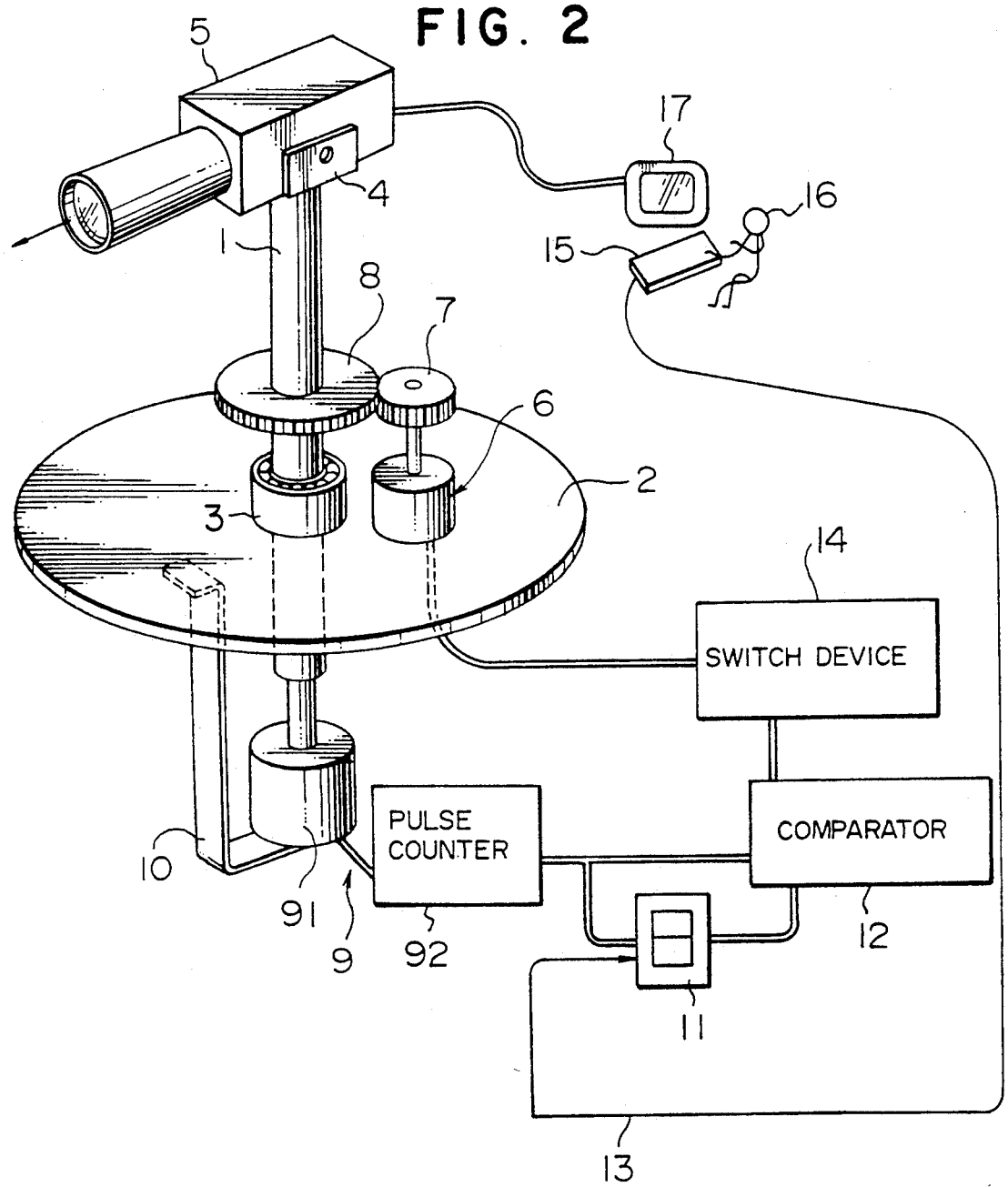
FIG. 2 is a schematic perspective view of a second embodiment of a monitoring camera turning apparatus of the present invention.

In an embodiment according to the present invention shown in FIG. 2, an angular sensor 9 comprises a pulse encoder 91 and a pulse counter 92. With this arrangement, the absolute value of the angular position of the turning shaft 1 can be detected.

When the turning shaft 1 is turned, pulses are fed from the pulse encoder 91 to the pulse counter 92 in which the number of pulses received are counted. The absolute value of the angular position of the turning shaft is detected by the number of the pulses thus counted.

With this construction, similar effects as described in connection with the first embodiment can be achieved.

Figure 3:
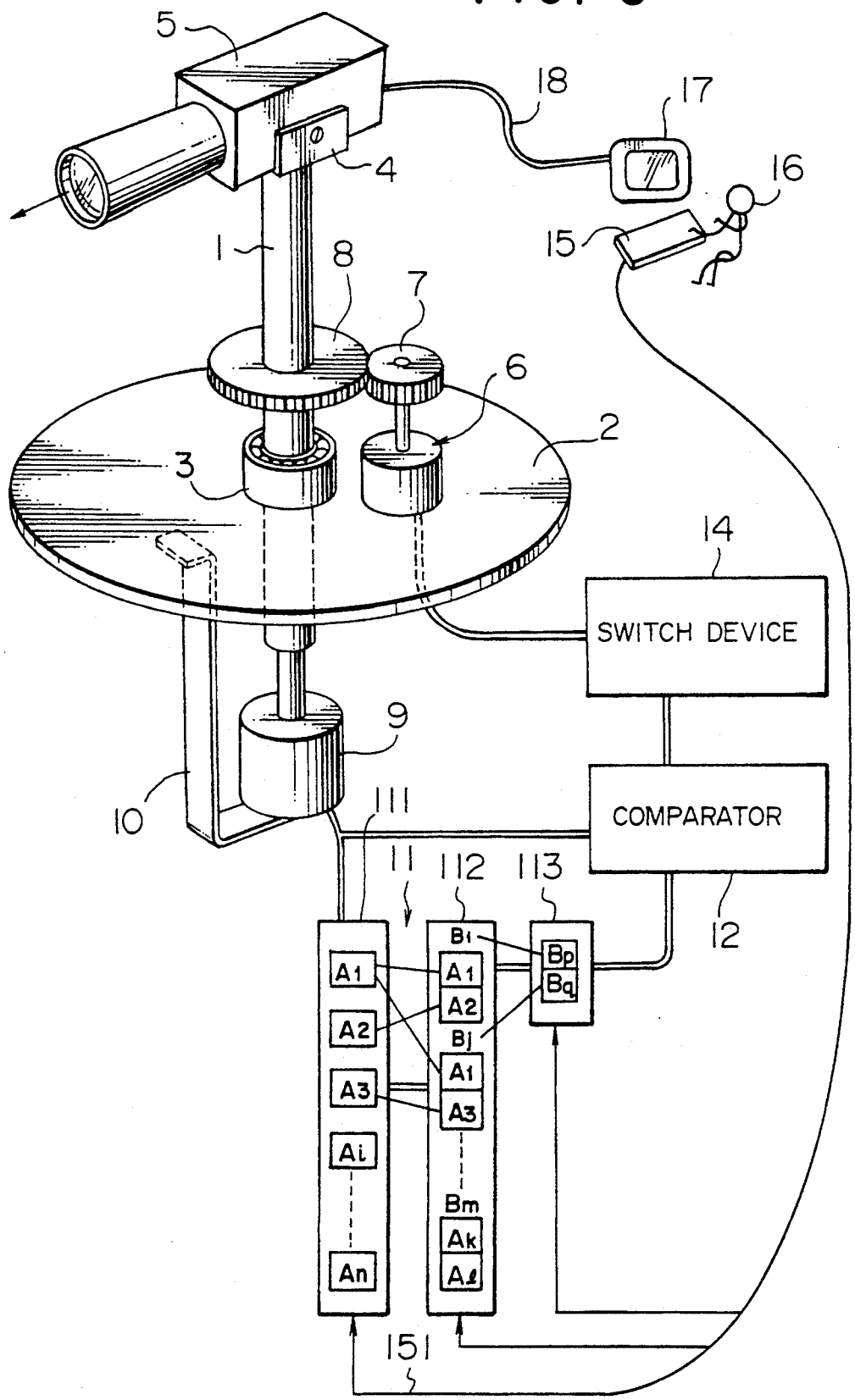
FIG. 3 is a schematic perspective view of a third embodiment of a monitoring camera turning apparatus of the present invention.

In an embodiment shown in FIG. 3, the recorder 11 comprises a first recording portion 111, a second recording portion 112 and a third recording portion 113. The another elements corresponding to those shown in FIG. 1 are referenced by the same numerals, and the description of the operations thereof is omitted. The first recording portion 111 can record not less than three angles (A1, A2, A3, $A_i$, . . . An) from the angular sensor 9. The second recording portion 112 records two angles ($A_k$, A$_1$) selected from the angles (A1, A2, A3, $A_i$, . . . An) recorded in the first recording portion 111 as a combination ($B_j$) of boundary limit angles. The second recording portion 112 can record not less than two combinations (B1, B2, Bj, . . . Bm). The third recording portion 113 records one pair of combinations (Bp, Bq) selected from the combination group (B1, B2, Bj, . . . Bm) recorded in the second recording portion 112. These recording operations are effected by the control device 15. More specifically, the operator 16 operates the control device 15 so as to output a trigger signal 151 to the first recording portion 111, which makes the first recording portion 111 record a turning angle ($A_i$) of the turning shaft 1 detected by the angular sensor 9 at the moment. The operator 16 operates the control device 15 to make the second recording portion 112 select two angles ($A_k$, A$_1$) as a combination (B.)3 of boundary limit angles, which represent a monitoring range of the monitoring camera 5 and record two or more such combinations (B1, B2, $B_j$, . . . Bm) . The operator 16 further operates the control device 15 to make the third recorder select one pair of combinations ($B_p$, $B_q$) selected from the combination group (B1, B2, $B_j$, . . . Bm) and record such pair. The timing of these operations of the control device 1 can be carried out by the operator 16 with monitoring a monitor television 17 connected through a coaxial cable 18 to the monitoring camera 11.

Figure 4:
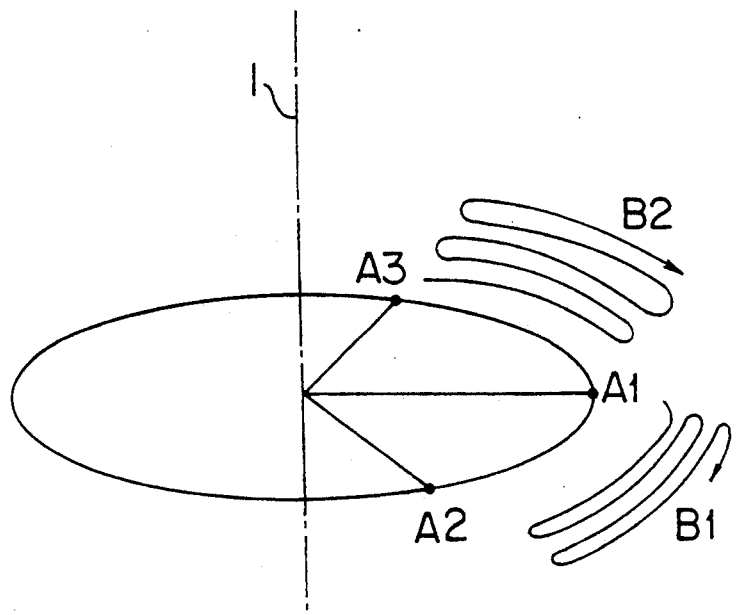
FIG. 4 is a perspective view showing monitoring ranges of the apparatus of FIG. 3.

According to the third embodiment, a plurality of different turning range combinations, for example, B1 and B2 (FIG. 4), can be beforehand set, and a desired one can be selected according to the requirement. For example, in case that the selection is effected with using a timer, one monitoring range (B1) is employed for a certain time zone, and another monitoring range (B2) is employed for another time zone, instead of (B1). Thus, the monitoring range can be automatically changed in accordance with the time zone.

Of course, selected monitoring ranges may be partially overlapped with each other or apart from each other.

Although the monitoring camera is turned in a single plane in the above three embodiments, the monitoring camera can be turned in a combination of two planes. Namely, a three-dimensional movement of the monitoring camera can be obtained. A fourth embodiment is a device for permitting such three dimensional movement of the monitoring camera.

Figure 6:
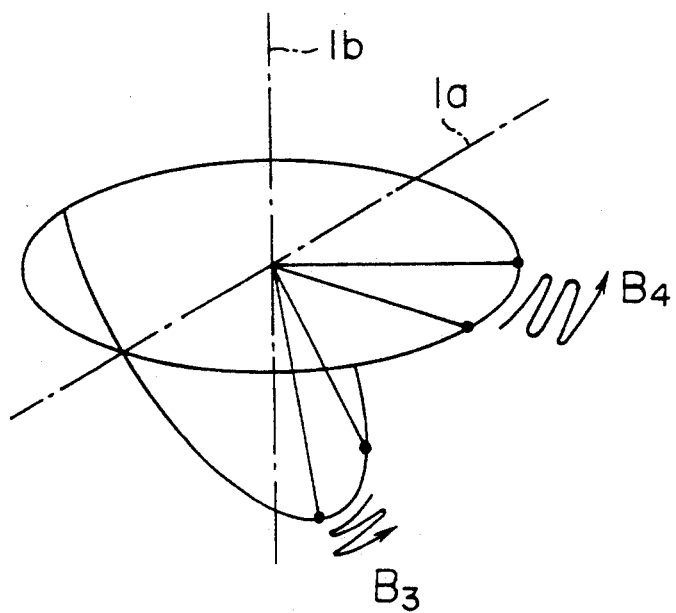
FIG. 6 is a perspective view showing a monitoring field of the apparatus of FIG. 5.

The apparatus of the fourth embodiment shown in FIG. 5 uses two apparatuses of the third embodiment. A turning shaft 1a of one apparatus is so arranged as to be perpendicularly to a turning shaft 1b of the other apparatus. A stationary disk 2a of the one apparatus is secured to a holder 4b on a distal end of the turning shaft 1b of the other apparatus. Each of two apparatuses can set its monitoring range independently while watching a video picture picked up by the monitoring camera 5. Namely, as shown in FIG. 6, one monitoring range (B3) of a monitoring camera 5 is to be determined by turning the turning shaft 1a of one apparatus while the turning shaft 1b is in an unturnable state. To the contrary, the other monitoring range (B4) of the monitoring camera 5 is to be determined by turning the turning shaft 1b of the other apparatus while the turning shaft 1a is in an unturnable state. Incidentally, in the monitoring ranges (B3, B4) shown in FIG. 6, an offset of the monitoring camera 5 from the turning shaft 1b isn't considered. Generally, such offset is considerably small as compared with a distance between the monitoring camera 5 and the subject to be monitored. Therefore, in FIG. 6, in order to make the explanation of the movement of the monitoring camera 5 simple, such offset isn't considered.

According to this embodiment, by means of operating both apparatuses, a three-dimensional movement of the monitoring camera can be obtained, thereby monitoring a wider field by means of a single monitoring camera.

According to the present invention, a pair of the boundary limit angles for determining the range of turning of the monitoring camera can be readily set and changeable without the mechanical resetting or readjustment of the apparatus. Two or more pairs of the boundary limit angles can be readily set and switched over freely. Further, in the embodiments described above, the above settings can be carried out while watching the video picture picked up by the monitoring camera, and therefore the desired turning range can be set accurately.

What is claimed is:

1. Apparatus for turning a monitoring camera comprising:
   means for mounting said monitoring camera, said mounting means adapted to be turned;
   means for detecting a turning angle of said mounting means;
   means for recording therein a pair of turning angles detected by said detecting means as monitoring boundary limit angles, wherein said recording means includes a first recorder for recording not less than three angles detected by said detecting means, and a second recorder for recording not less than two combinations of the angles, each combination consisting of two angles selected from said angles recorded in said first recorder;
   means for comparing said monitoring boundary limit angles recorded in said recording means with a turning angle detected by said detecting means at a moment; and
   means for changing a direction of turning of said mounting means in accordance with results of comparison by said comparing means.

2. Apparatus according to claim 1, wherein said detecting means includes a pulse encoder and a pulse counter.

* * * * *